(12) United States Patent
Myasnikov et al.

(10) Patent No.: US 7,727,492 B2
(45) Date of Patent: Jun. 1, 2010

(54) APPARATUS FOR REFUELING ON-BOARD METAL HYDRIDE HYDROGEN STORAGE TANK

(75) Inventors: Vitaliy Myasnikov, West Bloomfield, MI (US); Stanford R. Ovshinsky, Bloomfield Hills, MI (US)

(73) Assignee: Ovonic Hydrogen Systems LLC, Rochester Hills, MI (US)

( * ) Notice: Subject to any disclaimer, the term of this patent is extended or adjusted under 35 U.S.C. 154(b) by 1022 days.

(21) Appl. No.: 11/453,157

(22) Filed: Jun. 14, 2006

(65) Prior Publication Data
US 2007/0289882 A1   Dec. 20, 2007

(51) Int. Cl.
*B01J 19/00* (2006.01)
*F28D 15/00* (2006.01)
*H01M 8/18* (2006.01)
*B65D 85/00* (2006.01)

(52) U.S. Cl. .............. 422/198; 422/200; 165/104.12; 429/19; 429/20; 206/0.7

(58) Field of Classification Search .......... 422/198, 422/200; 165/104.12; 429/19, 20; 206/0.7; 196/146
See application file for complete search history.

(56) References Cited

U.S. PATENT DOCUMENTS 6,860,923 B2 * 3/2005 Myasnikov et al. .......... 96/146
2004/0213889 A1 * 10/2004 Dulau et al. ................ 426/656

* cited by examiner

*Primary Examiner*—Walter D Griffin
*Assistant Examiner*—Lessanework Seifu
(74) *Attorney, Agent, or Firm*—David W. Schumaker

(57) ABSTRACT

An onboard hydrogen storage unit for a hydrogen powered vehicle including one or more hydrogen storage vessels at least partially filled with a hydrogen storage material which stores hydrogen in metal hydride form. During operation of the hydrogen powered vehicle heat is provided to the hydrogen storage material within the one or more hydrogen storage vessels to aid in desorption of hydrogen from the hydrogen storage material. During hydrogen refueling, heat of hydride formation is removed from the hydrogen storage material within the one or more hydrogen storage vessels to aid in absorption of hydrogen into the hydrogen storage material. The heat of hydride formation is removed from the one or more hydrogen storage vessels via a heat transfer fluid circulated and/or cooled by a stream of compressed air.

9 Claims, 3 Drawing Sheets

APPARATUS FOR REFUELING ON-BOARD METAL HYDRIDE HYDROGEN STORAGE TANK

FIELD OF THE INVENTION

The present invention generally relates to a cooling and heating system for a hydrogen storage unit. More particularly, the present invention relates to a heat transfer system used to cool a metal hydride hydrogen storage vessel charging at a hydrogen fueling station.

BACKGROUND

As the world's population expands and its economy increases, the atmospheric concentrations of carbon dioxide are warming the earth causing climate change. However, the global energy system is moving steadily away from the carbon-rich fuels whose combustion produces the harmful gas. Experts say atmospheric levels of carbon dioxide may be double that of the pre-industrial era by the end of the next century, but they also say the levels would be much higher except for a trend toward lower-carbon fuels that has been going on for more than 100 years. Furthermore, fossil fuels cause pollution and are a causative factor in the strategic military struggles between nations.

For nearly a century and a half, fuels with high amounts of carbon have progressively been replaced by those containing smaller and smaller amounts of carbon. First wood, which is high in carbon, was eclipsed in the late $19^{th}$ century by coal, which contains less carbon. Then oil, with a lower carbon content still, dethroned "King Coal" in the 1960's. Now analysts say that natural gas, lighter still in carbon, may be entering its heyday, and that the day of hydrogen—providing a fuel with no carbon at all—may at last be about to dawn. As a result, experts estimate the world's economy today burns less than two-thirds as much carbon per unit of energy produced as it did in 1860.

In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The present invention shortens that period to a matter of years. In the near term, hydrogen will be used in fuel cells for cars, trucks and industrial plants, just as it already provides power for orbiting spacecraft. But ultimately, hydrogen will also provide a general carbon-free fuel to cover all fuel needs.

As noted in recent newspaper articles, large industries, especially in America, have long been suspicious of claims that the globe is warming and have vociferously negated the science of climate change. Electric utilities have even tried to stoke fears among ordinary folk that international treaties on climate change would cut economic growth and cost jobs. Therefore, it is very encouraging that some of the world's biggest companies, such as Royal Dutch/Shell and BP Amoco, two large European oil firms, now state plainly what was once considered heresy: global warming is real and merits immediate action. A number of American utilities vow to find ways to reduce the harm done to the atmosphere by their power plants. DuPont, the world's biggest chemicals firm, even declared that it would voluntarily reduce its emissions of greenhouse gases to 35% of their level in 1990 within a decade. The automotive industry, which is a substantial contributor to emissions of greenhouse gases and other pollutants (despite its vehicular specific reductions in emissions), has now realized that change is necessary as evidenced by their electric and hybrid vehicles.

Hydrogen is the "ultimate fuel." In fact, it is considered by most to be "THE" fuel for the next millennium, and, it is inexhaustible. Hydrogen is the most plentiful element in the universe (over 95%) and was the first element created by the "Big-Bang." Hydrogen can provide an inexhaustible, clean source of energy for our planet which can be produced by various processes which split water into hydrogen and oxygen. The hydrogen can be stored and transported in solid state form. The hydrogen can also be readily generated and stored. For example, economical, lightweight, triple-junction amorphous silicon solar cells (an invention pioneered by Stanford R. Ovshinsky, one of the instant inventors) such as those set forth in U.S. Pat. No. 4,678,679, (the disclosure of which is herein incorporated by reference) can be readily disposed adjacent a body of water, where their inherently high open circuit voltage can be used to dissociate water into its constituent gases, and collect the hydrogen so produced. Also, by placing these high efficiency solar panels on nearby farms, in water, or on land. Electricity can be generated to transport and pump the hydrogen into metal hydride storage beds. The hydrogen storage capacity of the hydrogen storage alloys allow hydrogen to be stored in solid form for transport by barge, tanker, train or truck in safe, economical form for ultimate use. Energy is the basic necessity of life and civilization for any society today and the use of hydrogen in the manner described herein as the basic source of energy would end wars fought for control of fossil fuels. Instead of "from well to wheel," the phrase now recited will be "from source to wheel."

In the past considerable attention has been given to the use of hydrogen as a fuel or fuel supplement. While the world's oil reserves are depletable, the supply of hydrogen remains virtually unlimited. Hydrogen can be produced from coal, natural gas and other hydrocarbons, or formed by the electrolysis of water, preferably via energy from the sun which is composed mainly of hydrogen and can itself be thought of as a giant hydrogen "furnace". Moreover hydrogen can be produced without the use of fossil fuels, such as by the electrolysis of water using nuclear or solar energy, or any other form of economical energy (e.g. wind, waves, geothermal, etc.). Furthermore, hydrogen, although presently more expensive than petroleum, is an inherently low cost fuel. Hydrogen has the highest density of energy per unit weight of any chemical fuel and is essentially non-polluting since the main by-product of "burning" hydrogen is water. Thus, hydrogen can be a means of solving many of the world's energy related problems, such as climate change, pollution, strategic dependency on oil, etc., as well as providing a means of helping developing nations.

While hydrogen has wide potential application as a fuel, a major drawback in its utilization, especially in mobile uses such as the powering of vehicles, has been the lack of acceptable lightweight compact hydrogen storage medium. Conventionally, hydrogen has been stored in pressure-resistant vessels under a high pressure or stored as a cryogenic liquid, being cooled to an extremely low temperature. Storage of hydrogen as a compressed gas or liquid involves the use of large and/or cryogenic vessels, making the use of hydrogen to power vehicles less feasible.

Alternatively, certain metals and alloys have been known to permit reversible storage and release of hydrogen. In this regard, they have been considered as a superior hydrogen-storage material, due to their high hydrogen-storage efficiency. Storage of hydrogen as a solid hydride can provide a greater volumetric storage density than storage as a compressed gas or a liquid form. Also, hydrogen storage in a solid hydride presents fewer safety problems than those caused by hydrogen stored in containers as a gas or a liquid. These alloys are fully described in U.S. Pat. No. 6,193,919, entitled "High Storage Capacity Alloys Enabling a Hydrogen-based Ecosystem", which is hereby incorporated by reference.

With these developments in the storage of hydrogen, hydrogen now has a viable use as a fuel to power vehicles. Solid-phase metal or alloy system can store large amounts of hydrogen by absorbing hydrogen with a high density and by forming a metal hydride under a specific temperature/pressure or electrochemical conditions, and hydrogen can be readily released by applying heat.

With hydrogen now being a viable source to power vehicles, considerable research has been performed on designing internal combustion engines to run on hydrogen rather than fossil fuels. In these designs, a hydrogen/air mixture is combusted inside an internal combustion engine much like gasoline and other hydrocarbon fuels are combusted in present day internal combustion engines. With hydrogen, however, catalytic converters are not needed to treat the exhaust to comply with emission standards. Hydrogen burns clean with the only byproduct being water.

Considerable research has also been performed on using fuel cells to power vehicles. Fuel cells, like batteries, operate by utilizing electrochemical reactions. Unlike a battery, in which chemical energy is stored within the cell, fuel cells generally are supplied with reactants from outside the cell to produce an electrical current used to power a vehicle. In fuel cells, a hydrogen stream, an oxygen stream, and an electrolyte stream are used to provide an electric current. Fuel cells offer a number of important advantages over internal combustion engine or generator systems. These include relatively high efficiency, environmentally clean operation, high reliability, few moving parts, and quiet operation. Fuel cells potentially are more efficient than other conventional power sources based upon the Carnot cycle.

For hydrogen to become a viable alternative to hydrocarbon fuels, various systems are needed for the storage and maintenance of hydrogen in vehicles. These systems must allow for simple and efficient refueling to gain acceptance by the general public. The stored hydrogen must also be available from the hydrogen storage system on demand to power a vehicle regardless of the outside temperature during startup or operation. Furthermore, hydrogen storage systems in vehicles must be designed with safety in mind. To prevent the hydrogen supplied to the vehicle from igniting during refueling, hydrogen powered vehicles and the electrical systems included therein are typically shut down to prevent the occurrence of sparks. One such system for providing heat to one or more metal hydride hydrogen storage vessels during vehicle operation and removing heat from one or more metal hydride hydrogen storage vessels during vehicle refueling is disclosed in U.S. Pat. No. 6,918,430 to Myasnikov et al. entitled "ONBOARD HYDROGEN STORAGE UNIT WITH HEAT TRANSFER SYSTEM FOR USE IN A HYDROGEN POWERED VEHICLE." The hydrogen storage unit as taught by Myasnikov. et al. circulates an offboard cooling fluid through the one or more metal hydride hydrogen storage vessels thereby effectively removing the heat of hydride formation. While this system effectively removes heat from the one or more metal hydride hydrogen storage vessels, a source of cooling fluid may not be readily available in all situations.

The present invention describes an innovative design for a heat transfer system used to cool a hydrogen powered vehicle's hydrogen storage bed during refueling without the use of electrical systems on-board the hydrogen powered vehicle. The heat transfer system removes heat of hydride formation from the hydrogen storage vessel of the hydrogen powered vehicle to minimize the time needed for refueling and supplies heat to the hydrogen storage vessel to aid in the release of hydrogen from the hydrided hydrogen storage alloy during operation of the vehicle and startup.

SUMMARY OF THE INVENTION

The present invention discloses an onboard hydrogen storage unit for a hydrogen powered vehicle. The onboard hydrogen storage unit comprises a gas inlet for receiving a stream of compressed gas, such as air or an inert gas, during refueling of the hydrogen powered vehicle and a gas outlet for expelling the stream of compressed gas during refueling of the hydrogen powered vehicle. The stream of compressed air may be supplied from an offboard source. The gas inlet may be a fast coupling connector.

The onboard hydrogen storage unit further comprises one or more hydrogen storage vessels at least partially filled with a hydrogen storage material, a primary heat transfer loop including a primary heat transfer fluid in thermal communication with the hydrogen storage material, and one or more gas driven pumps. The primary heat transfer loop removes heat from the hydrogen storage material during refueling of the hydrogen powered vehicle and may add heat to the hydrogen storage material during operation of the hydrogen powered vehicle. The one or more air driven pumps are supplied with the stream of compressed gas and circulate the primary heat transfer fluid through the primary heat transfer loop during refueling of the hydrogen powered vehicle.

The onboard hydrogen storage unit may further comprise a radiator in thermal communication with the primary heat transfer loop. The radiator cools the primary heat transfer loop during refueling and operation of the hydrogen powered vehicle. The radiator may cool the primary heat transfer fluid during refueling of the hydrogen powered vehicle by one or more of 1) blowing a portion of the stream of compressed gas across the radiator, 2) blowing the compressed gas exhaust from the one or more gas driven pumps across the radiator, 3) utilizing the compressed gas exhaust from the one or more gas driven pumps to drive a gas driven fan which blows air across the radiator, 4) utilizing a portion of the stream of compressed gas to drive a gas driven fan which blows air across the radiator, and 5) blowing the compressed gas exhaust from the gas driven fan across the radiator.

During operation of the hydrogen powered vehicle the primary heat transfer loop may remove heat from the hydrogen internal combustion engine and/or the fuel cell powering the hydrogen powered vehicle and supply the heat removed from the hydrogen internal combustion engine and/or the fuel cell to the hydrogen storage material.

The onboard hydrogen storage unit may further comprise a secondary heat transfer loop including a secondary heat transfer fluid in thermal communication with the primary heat transfer loop and the hydrogen storage material, the primary heat transfer loop being in thermal communication with the hydrogen storage material via the secondary heat transfer loop. The secondary heat transfer fluid may be circulated through the secondary heat transfer loop by one or more air driven pumps during refueling of the hydrogen powered vehicle. The primary heat transfer loop and the secondary heat transfer loop are in thermal communication via a heat exchanger.

During operation of the hydrogen powered vehicle the primary heat transfer loop may remove heat from the hydrogen internal combustion engine and/or the fuel cell powering the hydrogen powered vehicle and supply the heat removed from the hydrogen internal combustion engine and/or the fuel cell to the secondary heat transfer loop which heats the hydrogen storage material. During refueling of the hydrogen powered vehicle the secondary heat transfer loop may remove heat from the hydrogen storage material and the primary heat transfer loop removes the heat removed from the hydrogen storage material from the secondary heat transfer loop.

DETAILED DESCRIPTION OF THE INVENTION

The present invention discloses an onboard hydrogen storage unit with heat transfer system for use in a hydrogen powered vehicle. The heat transfer system is designed to be used in conjunction with at least one hydrogen storage vessel at least partially filled with a hydrogen storage alloy. The one or more hydrogen storage vessels receive hydrogen from a refueling station and supply the hydrogen to the internal combustion engine and/or fuel cell of the hydrogen powered vehicle during operation. As used herein, a refueling station may be any type structure or apparatus which supplies hydrogen to hydrogen storage tanks.

During refueling, the hydrogen storage alloy contained inside the hydrogen storage vessel absorbs hydrogen and stores the hydrogen in metal hydride form, thereby producing a considerable amount of heat (heat of hydride formation). If the heat of hydride formation is not removed from the hydrogen storage vessel, the rate of absorption of hydrogen into the hydrogen storage alloy is decreased thereby increasing the time for refueling the vessel. The heat of hydride formation must be removed fast enough to maximize the absorption rate of hydrogen into the hydrogen storage alloy thereby minimizing the time needed for refueling. The present invention discloses a novel approach for removing the heat of hydride formation from the hydrogen storage vessel during refueling to minimize refueling time.

In addition to cooling the hydrogen storage alloy, the present invention is also designed to supply heat to the hydrogen storage alloy during startup or operation of the hydrogen powered vehicle.

Adding heat to the hydrogen storage alloy aids in releasing the hydrogen from the hydrogen storage alloy, resulting in a readily available stream of hydrogen being supplied from the hydrogen storage vessel.

Figure 1:
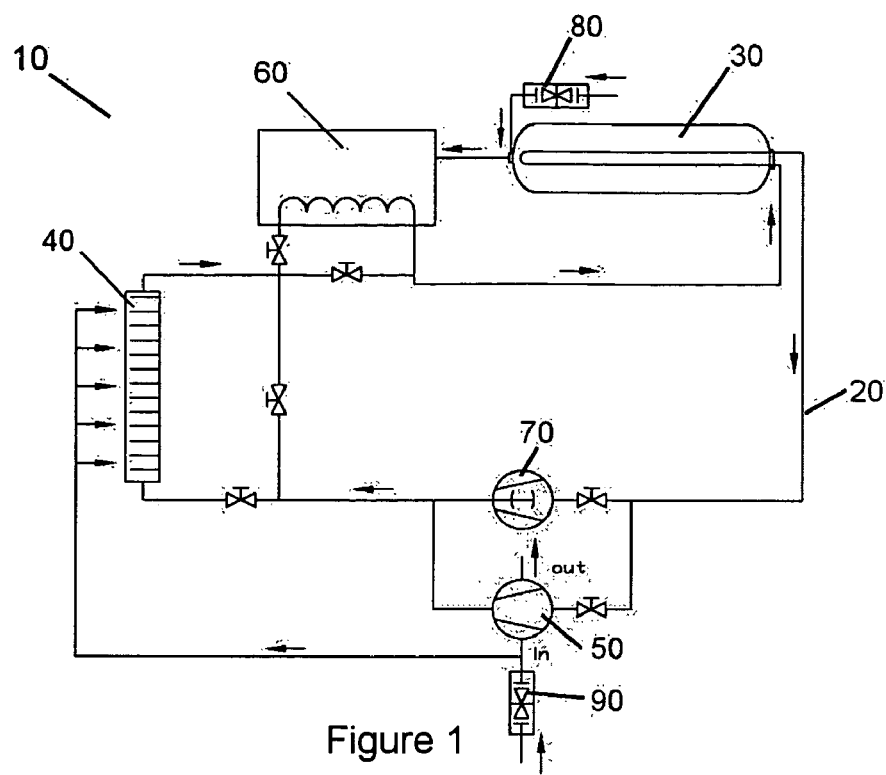
FIG. 1, is a depiction of the preferred embodiment of the onboard hydrogen storage unit in accordance with the present invention.

A preferred embodiment 10 of the onboard hydrogen storage unit is shown in FIG. 1. The present invention comprises a primary heat transfer loop 20 containing a primary heat transfer fluid, one or more hydrogen storage vessels 30, a radiator 40, and one or more air driven pumps 50. The primary heat transfer loop 20 is in thermal communication with the radiator 40, the one or more hydrogen storage vessels 30 and the internal combustion engine and/or fuel cell 60 used to power the hydrogen powered vehicle. The primary heat transfer fluid contained within the primary heat transfer loop may be water, ethylene glycol, mixtures thereof or other fluids suitable for heat transfer within the system.

During operation of the hydrogen powered vehicle, hydrogen is supplied from the one or more hydrogen storage vessels 30 to the internal combustion engine and/or fuel cell 60 used to power the hydrogen powered vehicle. The primary heat transfer loop 20 removes heat from the internal combustion engine and/or fuel cell 60 of the hydrogen powered vehicle and provides heat to the hydrogen storage material disposed in the one or more hydrogen storage vessels 30. The heat transfer fluid circulates through the primary heat transfer loop 20 and is brought into thermal communication with the internal combustion engine and/or fuel cell 60 whereby the heat transfer fluid removes heat from the internal combustion engine and/or fuel cell. After being brought into thermal communication with the internal combustion engine and/or fuel cell 60 of the hydrogen powered vehicle, the heat transfer fluid is brought into thermal communication with the one or more hydrogen storage vessels 30 whereby the heat transfer fluid provides heat to the hydrogen storage material disposed therein. After being brought into thermal communication with the one or more hydrogen storage vessels 30, the heat transfer fluid is circulated through the radiator 40 which cools the heat transfer fluid prior to the heat transfer fluid being brought into thermal communication with the hydrogen internal combustion engine and/or fuel cell 60. To cool the heat transfer fluid, the radiator 40 may utilize air flowing across the radiator 40 as the hydrogen powered vehicle is in motion, and/or a fan blowing air across the radiator. During operation of the hydrogen powered vehicle, the radiator 40 may not be needed to cool the heat transfer fluid prior to the heat transfer fluid being brought into thermal communication with the hydrogen internal combustion engine and/or fuel cell 60. When the radiator 40 is not needed, valves may be opened and closed which allow the heat transfer fluid to bypass the radiator 40. The heat transfer fluid may be circulated through the primary heat transfer loop during operation of the hydrogen powered vehicle by an electrical pump 70. The electrical pump 70 may be powered by a battery, fuel cell, or alternator on board the hydrogen powered vehicle.

During refueling, hydrogen is supplied from the refueling station to the one or more hydrogen storage vessels 30 containing a hydrogen storage material. The hydrogen supply at the refueling station is sealably connected to a hydrogen inlet 80. The hydrogen inlet 80 may comprise a fast coupling connector providing an air tight seal with the hydrogen supply. The hydrogen flows from the refueling station through the hydrogen inlet 80 and through a conduit to the one or more hydrogen storage vessels 30 containing the hydrogen storage material. The hydrogen is absorbed by the hydrogen storage material and heat of hydride formation is produced. To maintain optimal absorption of the hydrogen into the hydrogen storage material, the heat of hydride formation must be removed from the hydrogen storage alloy.

As hydrogen is supplied to the one or more hydrogen storage vessels 30, a heat transfer fluid is circulated through the primary heat transfer loop 20 in thermal communication with the hydrogen storage material. The heat transfer fluid cools the hydrogen storage material thereby removing the heat of hydride formation from the one or more hydrogen storage vessels. After the heat transfer fluid is brought into thermal communication with the hydrogen storage material stored in the one or more hydrogen storage vessels 30, the heat transfer fluid is circulated through the radiator 40 which cools the heat transfer fluid. During refueling of the hydrogen powered vehicle, valves may be opened and/or closed which allow the heat transfer fluid to bypass the internal combustion engine and/or fuel cell 60.

Figure 2:
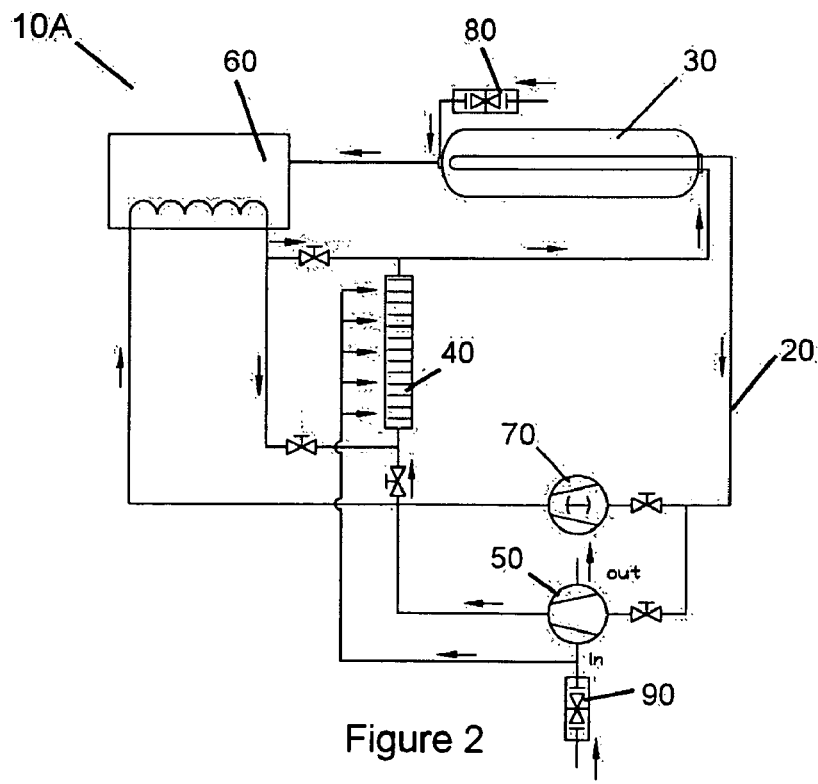
FIG. 2, is a depiction of the preferred embodiment of FIG. 1 having a different arrangement of components.
Figure 3:
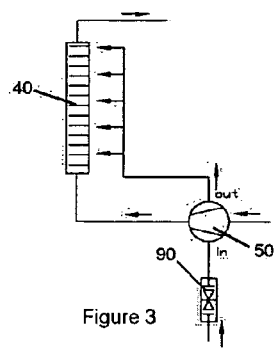
FIG. 3, is a depiction of the onboard hydrogen storage unit in accordance with the present invention wherein the compressed air exhaust from the air driven pump is blown across the radiator used therein.
Figure 4:
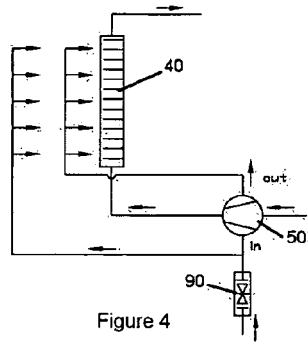
FIG. 4, is a depiction of the onboard hydrogen storage unit in accordance with the present invention wherein a portion of the compressed air stream and the compressed air exhaust from the air driven pump to is blown across the radiator used therein.
Figure 5:
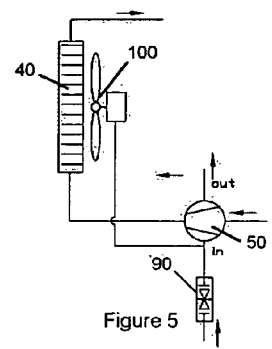
FIG. 5, is a depiction of the onboard hydrogen storage unit in accordance with the present invention wherein a portion of the compressed air stream drives a fan which cools the radiator used therein.
Figure 6:
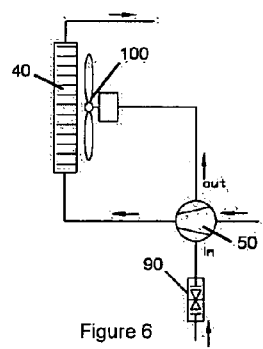
FIG. 6, is a depiction of the onboard hydrogen storage unit in accordance with the present invention wherein the air driven pump exhaust drives a fan which cools the radiator used therein.
Figure 7:
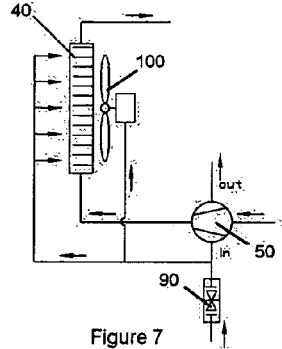
FIG. 7, is a depiction of the onboard hydrogen storage unit in accordance with the present invention wherein a portion of the compressed air stream is blown across the radiator and a portion of the compressed air stream drives a fan which cools the radiator used therein.
Figure 8:
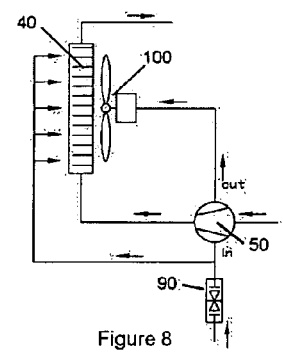
FIG. 8, is a depiction of the onboard hydrogen storage unit in accordance with the present invention wherein a portion of the compressed air stream is blown across the radiator and the compressed air exhaust from the air driven pump drives a fan which cools the radiator used therein.
Figure 9:
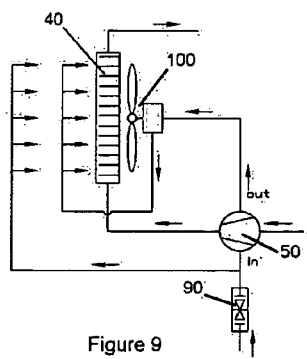
FIG. 9, is a depiction of the onboard hydrogen storage unit in accordance with the present invention wherein a portion of the compressed air stream is blown across the radiator, the compressed air exhaust from the air driven pump drives a fan which cools the radiator, and the compressed air exhaust from the fan is blown across the radiator used therein.
Figure 10:
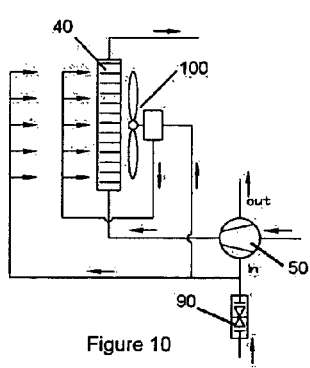
FIG. 10, is a depiction of the onboard hydrogen storage unit in accordance with the present invention wherein a portion of the compressed air stream is blown across the radiator, a portion of the compressed air stream drives a fan which cools the radiator, and the compressed air exhaust from the fan is blown across the radiator used therein.
Figure 11:
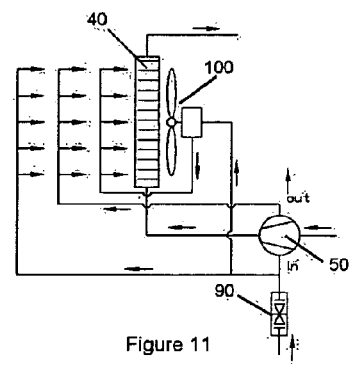
FIG. 11, is a depiction of the onboard hydrogen storage unit in accordance with the present invention wherein a portion of the compressed air stream is blown across the radiator, a portion of the compressed air stream drives a fan which cools the radiator, the compressed air exhaust from the fan is blown across the radiator, and the compressed air exhaust from the air driven pump is blown across the radiator used therein.

The components of the onboard hydrogen storage unit may have various arrangements provided the primary heat transfer loop removes heat of hydride formation from the hydrogen storage material disposed in the one or more pressure containment vessels during refueling and provides heat to hydrogen storage material disposed within the one or more hydrogen storage units during operation of the hydrogen powered vehicle. An alternative arrangement 10A of the onboard hydrogen storage unit is depicted in FIG. 2.

The heat transfer fluid may be circulated through the primary loop via the one or more air driven pumps 50. The heat transfer fluid may be directed to the one or more air driven pumps 50 instead of the electrical pump 70, as used to circulate the heat transfer fluid during operation of the hydrogen powered vehicle, via the use of one or more valves in the primary loop 20. The one or more air driven pumps are supplied with compressed air from the refueling station. The source of compressed air is sealably connected to a compressed air inlet 90. The compressed air inlet 90 may be a fast coupling connector providing an air tight seal with the source of compressed air.

Figure 12:
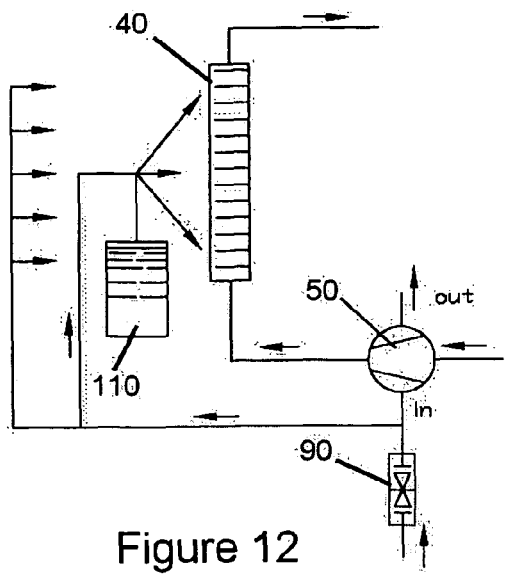
FIG. 12, is a depiction of the onboard hydrogen storage unit in accordance with the present invention whereby a cooling fluid is added to the compressed air stream blown across the radiator used therein.

A portion of the compressed air stream and/or the exhaust from the one or more air driven pumps may be used to cool the radiator 40. The radiator 40 may be cooled by one or more of 1) blowing a portion of the compressed air across the radiator 40, 2) blowing the exhaust from the one or more air driven pumps 50 across the radiator 40, 3) utilizing the exhaust from the one or more air driven pumps to drive a fan 100 which blows air across the radiator 40, 4) utilizing a portion of the compressed air stream to drive a fan 100 which blows air across the radiator 40, 5) blowing the exhaust from the air driven fan across the radiator 40, as shown in FIGS. 3-11. A water tank 110 may also be used to cool the radiator whereby water stored in the water tank 110 is added to the compressed air stream, the one or more air driven pumps exhaust stream, and/or the air driven fan exhaust stream prior to blowing across the radiator, as shown in FIG. 12. The compressed air steam, the one or more air driven pumps exhaust stream, and/or the air driven fan exhaust may also be blown through an expansion outlet onto the radiator providing additional cooling via the expansion of the air stream. While the preferred embodiments of the present invention utilize a compressed air stream, any type compressed gas, such as inert gas, may be used with the system described herein.

Figure 13:
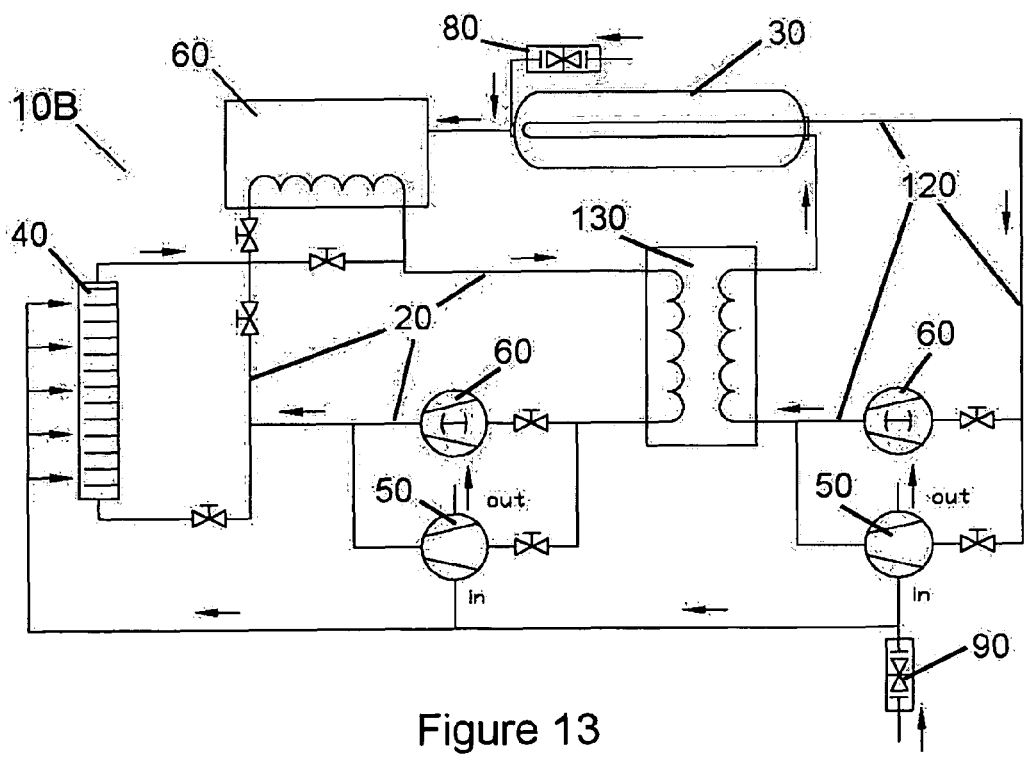
FIG. 13, is a depiction of an alternative embodiment of the onboard hydrogen storage unit in accordance with the present invention.

In an alternative embodiment 10B of the present invention as depicted in FIG. 13, the onboard hydrogen storage system comprises a primary heat transfer loop 20 containing a primary heat transfer fluid, a secondary heat transfer loop 120 containing a secondary heat transfer fluid, one or more hydrogen storage vessels 30, a radiator 40, a heat exchanger 130, and one or more air driven pumps 50. The primary heat transfer loop 20 is in thermal communication with the radiator 40, and the internal combustion engine and/or fuel cell 60 used to power the hydrogen powered vehicle. The secondary heat transfer loop 120 is in thermal communication with the hydrogen storage material stored within the one or more hydrogen storage vessels 30. The primary heat transfer loop 20 and the secondary heat transfer loop 120 are in thermal communication with one another via the heat exchanger 130. The primary heat transfer fluid contained within the primary heat transfer loop 20 and the secondary heat transfer fluid contained within the secondary heat transfer loop 120 may be water, ethylene glycol, mixtures thereof or other fluids suitable for heat transfer within the system.

During operation of the hydrogen powered vehicle, hydrogen is supplied from the one or more hydrogen storage vessels 30 to the internal combustion engine and/or fuel cell 60 used to power the hydrogen powered vehicle. To aid in hydrogen desorption from the hydrogen storage material, heat is supplied to the hydrogen storage material stored within the one or more hydrogen storage vessels 30 via the secondary heat transfer loop 120. After providing heat to the hydrogen storage material stored within the one or more hydrogen storage vessels 30, the heat transfer fluid in the secondary heat transfer loop 120 is circulated through the heat exchanger 130 where it is heated by the heat transfer fluid in the primary heat transfer loop 20.

The primary heat transfer loop 20 removes heat from the internal combustion engine and/or fuel cell 60 and supplies the heat removed from the internal combustion engine and/or fuel cell 60 to the heat transfer fluid in the secondary heat transfer loop 120 via the heat exchanger 130. After circulating through the heat exchanger 130, the heat transfer fluid in the primary heat transfer loop 20 circulates through the radiator 40 and is cooled prior to being brought into thermal communication with the internal combustion engine and/or fuel cell 60. To cool the heat transfer fluid, the radiator 40 may utilize air flowing across the radiator 40 as the hydrogen powered vehicle is in motion, and/or a fan blowing air across the radiator 40. During operation of the hydrogen powered vehicle, the radiator 40 may not be needed to cool the heat transfer fluid prior to the heat transfer fluid being brought into thermal communication with the internal combustion engine and/or fuel cell. When the radiator 40 is not needed, valves may be opened and closed which allow the heat transfer fluid to bypass the radiator 40. The heat transfer fluid may be circulated through the primary heat transfer loop 20 during operation of the hydrogen powered vehicle by an electrical pump 70. The electrical pump 70 may be powered by a battery, fuel cell, or alternator on board the hydrogen powered vehicle.

During refueling, as hydrogen is supplied to the one or more hydrogen storage vessels 30, the secondary heat transfer loop 120 removes heat of hydride formation from the hydrogen storage material. After the heat transfer fluid is brought into thermal communication with the hydrogen storage material and removes at least a portion of the heat of hydride formation, the heat transfer fluid is circulated through the heat exchanger 130 and is cooled by the heat transfer fluid in the primary heat transfer loop 20. After exiting the heat exchanger 130, the heat transfer fluid in the primary heat transfer loop 20 is circulated through the radiator 40 which cools the heat transfer fluid as previously described. During refueling of the hydrogen powered vehicle, one or more valves may be opened or closed in the primary heat transfer loop 20 which allow the heat transfer fluid to bypass the internal combustion engine and/or fuel cell 60.

The heat transfer fluid may be circulated through the primary heat transfer loop 20 and the secondary heat transfer loop 120 via one or more air driven pumps 50. The heat transfer fluid may be directed to the one or more air driven pumps 50 instead of the electrical pumps 70, as used to circulate the heat transfer fluid during operation of the hydrogen powered vehicle, via the use of one or more valves in the primary heat transfer loop 20 and the secondary heat transfer loop 120. The one or more air driven pumps 50 are supplied with compressed air from the refueling station as previously described.

Although the embodiments described herein describe the hydrogen storage unit as being used in conjunction with a vehicle, it is not the intention of the inventors to so limit the present invention. The hydrogen storage unit in accordance with the present invention may be used with stationary applications or any other application including a hydrogen storage vessel.

The one or more hydrogen storage vessels 30 may be pressure containment vessels at least partially filled with a hydrogen storage alloy. The hydrogen storage vessels may have a series of tube running throughout the interior of the vessels through which the heat transfer fluid circulates. The tubing may be adapted to receive a heat transfer fluid and use such fluid to heat or cool the contents of the vessel. The interior of such vessels may also be divided into compartments by thermally conductive materials to better accommodate heat transfer throughout the vessel and prevent densification and subsequent expansion of the hydrogen storage alloy (upon charging with hydrogen) which can cause strain to the wall of the vessel. Such hydrogen storage vessels are described in detail in U.S. Pat. Nos. 6,709,497; 6,708,546, and 6,626,323, the disclosure of which is herein incorporated by reference.

The hydrogen storage material may be any hydrogen storage material known in the art which provides for the storage of hydrogen. Preferably, the hydrogen storage material is a hydrogen storage alloy. The hydrogen storage alloy is preferably non-pyrophoric. Specific alloys include $AB_2$, $AB_5$, or BCC phase alloys, such as rare earth-nickel alloys, titanium-manganese alloys, titanium-zirconium alloys, titanium-iron alloys, magnesium alloys, and the like. Examples of such alloys can be found in U.S. Pat. Nos. 6,726,783; 6,591,616; 6,517,970; 6,491,866; 6,328,821; 6,193,929; 6,103,024; 5,976,276; 5,916,381; 5,840,440; 4,832,913; and 4,431,561; all of which are herein incorporated by reference.

An example of a useful hydrogen storage alloy is a low temperature hydrogen storage alloy which is non-pyrophoric upon exposure to ambient atmosphere. The alloy particularly is non-pyrophoric even after hydrogen charge/discharge cycling. The alloy is an atomically engineered $TiMn_2$ type alloy. Preferred embodiments of the non-pyrophoric low temperature hydrogen storage alloy comprises titanium, zirconium, vanadium, chromium, and manganese. The alloy may further include iron and aluminum. Atomic engineering of the alloy included adjusting the composition of the alloy to include increased chromium levels beyond that of conventional $TiMn_2$ alloys. That is, as the chromium content of the alloy increases, the tendency to be pyrophoric decreases. Particularly preferred alloy compositions comprise 0.5-10 at. % Zr, 29-35 at. % Ti, 10-15 at. % V, 13-20 at. % Cr, 32-38 at. % Mn, 1.5-3.0 at. % Fe, and 0.05-0.5 at. % Al. The alloy may further contain 1-10 at. % total of at least one element selected from the group consisting of Ba, Co, Cu, Cs, K, Li, Mm, Mo, Na, Nb, Ni, Rb, Ta, Tl, and W. Specific examples of useful alloys include the compositions $Zr_1Ti_{33}V_{12.54}Cr_{15}Mn_{36}Fe_{2.25}Al_{0.21}$ and $Zr_{1.5}Ti_{32.5}V_{12.54}Cr_{15}Mn_{36}Fe_{2.25}Al_{0.21}$.

The foregoing is provided for purposes of explaining and disclosing preferred embodiments of the present invention. Modifications and adaptations to the described embodiments, particularly involving changes to the primary or secondary loops, the operating conditions of the heat transfer system, and positioning of the system components will be apparent to those skilled in the art. These changes and others may be made without departing from the scope or spirit of the invention in the following claims.

The invention claimed is:

1. A hydrogen storage unit comprising:
   one or more hydrogen storage vessels;
   a gas inlet for receiving a stream of compressed gas during charging of said one or more hydrogen storage vessels;
   a gas outlet for expelling said stream of compressed gas during charging of said one or more hydrogen storage vessels;
   a hydrogen storage material disposed in one or more of said hydrogen storage vessels;
   a primary heat transfer loop including a primary heat transfer fluid in thermal communication with said hydrogen storage material, said primary heat transfer low removing heat from said hydrogen storage material during charging of said hydrogen storage material;
   one or more gas driven pumps, said one or more air driven pumps being supplied with said stream of compressed gas and circulating said primary heat transfer fluid through said primary heat transfer loop during charging of said hydrogen storage material; and a secondary heat transfer loop including a secondary heat transfer fluid in thermal communication with said primary heat transfer loop and said hydrogen storage material, said primary heat transfer loop being in thermal communication with said hydrogen storage material via said secondary heat transfer loop, said secondary heat transfer fluid being circulated through said secondary heat transfer loop by said one or more air driven pumps during charging of said hydrogen storage material.

2. The hydrogen storage unit according to claim 1 further comprising a radiator in thermal communication with said primary heat transfer loop, said radiator cooling said primary heat transfer loop during charging of said hydrogen storage material.

3. The hydrogen storage unit according to claim 2, wherein said radiator is cooled during charging of said hydrogen storage material by one or more of:
  1) blowing a portion of said stream of compressed gas across said radiator,
  2) blowing the compressed gas exhaust from said one or more gas driven pumps across said radiator,
  3) utilizing the compressed gas exhaust from said one or more gas driven pumps to drive a gas driven fan which blows air across said radiator,
  4) utilizing a portion of said stream of compressed gas to drive a gas driven fan which blows air across said radiator, and
  5) blowing the compressed gas exhaust from said gas driven fan across said radiator.

4. The hydrogen storage unit according to claim 1, wherein said primary heat transfer loop supplies heat to said hydrogen storage material during discharge of hydrogen from said hydrogen storage material.

5. The hydrogen storage unit according to claim 4, wherein during discharge of said hydrogen storage material, said primary heat transfer loop removes heat from a hydrogen consuming application and supplies the heat removed from said hydrogen consuming application to said hydrogen storage material.

6. The hydrogen storage unit according to claim 1, wherein said primary heat transfer loop and said secondary heat transfer loop are in thermal communication via a heat exchanger.

7. The hydrogen storage unit according to claim 1, wherein during discharge of said hydrogen storage material, said primary heat transfer loop removes heat from a hydrogen consuming application and supplies the heat removed from said hydrogen consuming application to said secondary heat transfer loop.

8. The hydrogen storage unit according to claim 1, wherein during charging of said hydrogen storage material, said secondary heat transfer loop removes heat from said hydrogen storage material and said primary heat transfer loop removes the heat said secondary heat transfer loop.

9. The hydrogen storage unit according to claim 1, wherein said gas inlet is a fast coupling connector.

* * * * *